United States Patent [19]
Parris et al.

[11] 3,833,112
[45] Sept. 3, 1974

[54] APPARATUS FOR CLAMPING AND DISCHARGING WORKPIECE

[75] Inventors: John L. Parris, Knoxville; Herman J. Oldham, Oak Ridge, both of Tenn.

[73] Assignee: The Carborundum Company, Niagara Falls, N.Y.

[22] Filed: Sept. 13, 1972

[21] Appl. No.: 288,838

Related U.S. Application Data

[62] Division of Ser. No. 114,913, Feb. 12, 1971, Pat. No. 3,712,605.

[52] U.S. Cl............................ 198/283, 214/1 QG
[51] Int. Cl........................................... B65g 47/24
[58] Field of Search...... 214/1 Q, 1 QG; 198/33 AC

[56] References Cited
UNITED STATES PATENTS

| | | | |
|---|---|---|---|
| 654,406 | 7/1900 | Lewis............................ | 214/1 QG X |
| 1,217,919 | 3/1917 | Coryell........................ | 198/33 AC X |
| 2,734,618 | 2/1956 | Palmer.......................... | 198/33 AC |

FOREIGN PATENTS OR APPLICATIONS

| | | | |
|---|---|---|---|
| 951,002 | 10/1956 | Germany............................. | 214/1 P |
| 881,136 | 11/1961 | Great Britain.................. | 214/1 QG |

*Primary Examiner*—Frank E. Werner
*Attorney, Agent, or Firm*—David E. Dougherty; Raymond W. Green

[57] ABSTRACT

In a workpiece clamping and discharging device for a frame, a work-engaging member is journaled for rotation about a vertical axis adjacent the workpiece. As the work-engaging member is turned, an inclined surface thereon which is spaced from the axis of rotation slidably contacts the workpiece to push the workpiece upwardly and outwardly. Further turning of the work-engaging member causes an abutment at the upper portion of the inclined surface to engage the workpiece thereby laterally urging the workpiece across the frame so as to clamp or discharge the workpiece.

8 Claims, 4 Drawing Figures

APPARATUS FOR CLAMPING AND DISCHARGING WORKPIECE

This is a division of copending application Ser. No. 114,913, filed Feb. 12, 1971, now U.S. Pat. No. 3,712,605.

BACKGROUND OF THE INVENTION

This invention relates to a new and improved mechanism for discharging and clamping a workpiece.

In devices for manipulating workpieces such as heavy billets, the billet is generally supported on an elongated table or frame. The general practice is to provide the table with separate mechanisms for discharging and clamping a workpiece which are independently operated.

Although prior art devices have served the purpose for which they were designed, they have not been entirely satisfactory because of their complexity in construction and in operation. Furthermore, they are often so bulky that they cannot be directly mounted on the table or they interfere with other processing and manipulating operations of a billet.

Heretofore, clamping and billet discharging devices have not effectively served to both clamp and discharge a workpiece from a table or frame with a simple motion of a work-engaging member.

SUMMARY OF THE INVENTION

In accordance with the present invention, there is provided a workpiece clamping and discharging apparatus for a fixture comprising a work-engaging means journaled on the frame for rotation about a fixed axis, means for turning said work-engaging means about the fixed axis, said work-engaging means having an inclined surface spaced from the axis and an abutment at the upper portion of said inclined surface for urging the workpiece laterally across the work-engaging means is rotated.

In a billet manipulating device as described in copending U.S. patent application entitled "Device for Turning Workpieces," by John L. Parris filed on the same day as the present application, the billet turning device comprises a plurality of turning spools spaced lengthwise along the frame. Each spool is supported for rotation about an axis transverse to the frame. As the spools are rotated together the billet is turned about its longitudinal axis. The billet clamping and discharging device of the present invention comprises a work-engaging member positioned between spools. Actuation of the work-engaging member either clamps the billet against a flange at one end of the spool or discharges the billet from the table.

The preferred embodiment of the present invention provides an improved apparatus for clamping and discharging workpieces which is compact, strong in construction, rugged, durable and simple in its operation. The billet or workpiece is clamped or discharged with the simple movement of one or more work-engaging members.

These and other advantages of the present invention are readily apparent from reading the following description of the present invention.

BRIEF DESCRIPTION OF THE DRAWINGS

The drawings which illustrate a preferred embodiment of the present invention are as follows.

DETAILED DESCRIPTION

Figure 1:
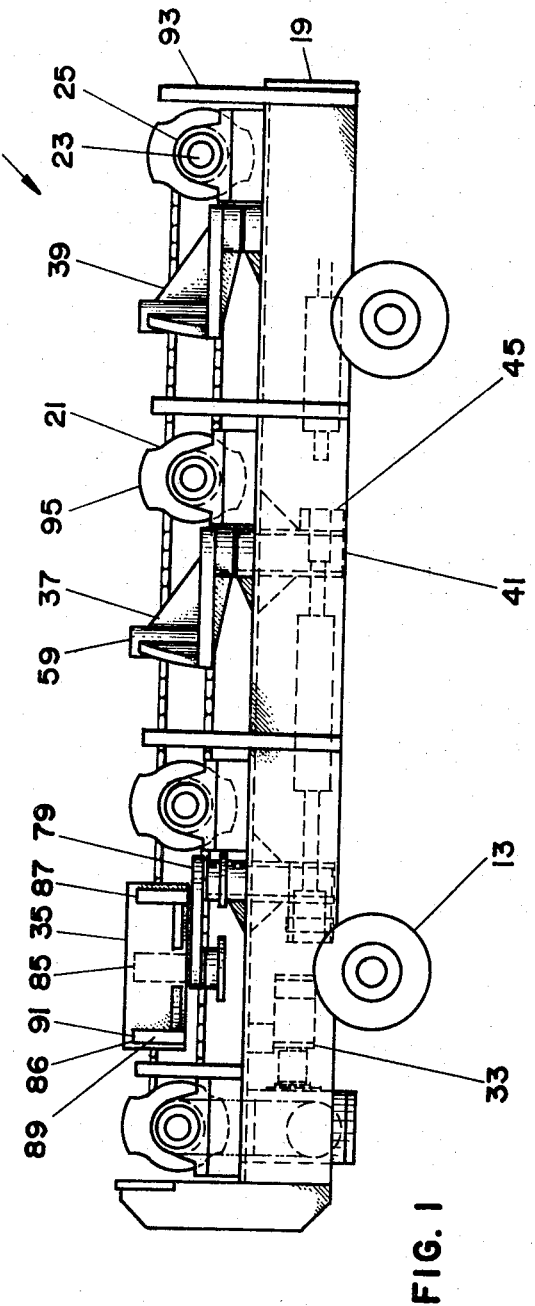
FIG. 1 is a side elevational view of the billet manipulating apparatus.

As illustrated in FIG. 1, a billet manipulator, generally indicated at 11 is supported for movement by wheels 13. This permits positioning the billet or workpiece 15 in different locations for various operations such as loading, grinding, inspecting, and unloading. A conventional loading apparatus can be utilized so that a billet falls lengthwise onto the billet manipulator 11. Many arrangements of grinding machines and billet manipulators 11 are known in the prior art so that no further explanation of a grinding operation is believed necessary. A conveyor or platform adjacent the billet manipulator 11 can be used to receive a discharged billet.

Although the billet manipulator 11 as illustrated in the drawings includes a plurality of wheels 13 mounted on the lower portion of a fixture or frame 19, it should be understood that the frame 19 can be any suitable supporting means which can rest directly on the floor or ground.

In the preferred embodiment of the present invention, a plurality of turning spools 21 are longitudinally spaced above the frame 19. Each spool 21 is supported for rotation about an axis transverse to the frame 19. One of the axles 23 is firmly connected to each end of the spools 21. The axles 23 are mounted for rotation on a pair of upright columns 25 which are mounted on either side of the frame 19.

Figure 2:
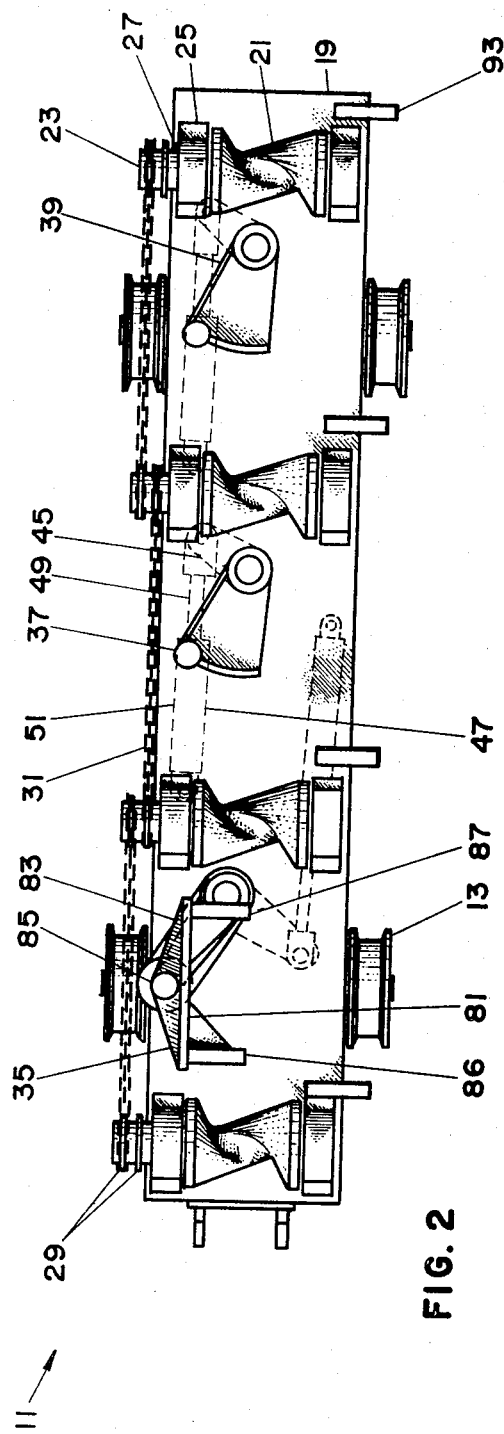
FIG. 2 is a top elevational view of the billet turning apparatus.

The spools 21 are provided with a means for rotating the spools together so that they effectively turn a workpiece or billet 15. As illustrated in FIG. 2, each spool is provided with one of the axles 23 which extends through an opening 27 in the upright columns 25 on one side of the frame 19. Exterior to the columns 25 a pair of gears or drive wheels 29 are mounted rigidly on the axles 23. The gears 29 are interconnected by a plurality of endless belts of chains 31 one of which is connected to a drive motor 33.

The details of the billet-turning device and the shape of the peripheral surfaces of the spools are more fully described in copending application entitled "Device for Turning Workpieces" by John L. Parris, filed on the same day as the present application.

The clamping and discharging device of the present invention includes a plurality of work-engaging members 35, 37 and 39, which are positioned along the frame for urging the workpiece or billet 15 laterally across the frame 19. Each work-engaging member 35, 37 and 39 is mounted for turning about a fixed axis. Although a plurality of work-engaging members 35, 37 and 39 are employed so that the billet 15 is effectively engaged at portions along its entire length, the construction of members 37 and 39, their operation and associated parts are similar. Therefore, it is believed that a description of one member 37 and associate parts will suffice.

Work-engaging member 37 is rigidly secured to a vertical shaft 41 for rotation about the fixed axis, shaft 41 which is substantially perpendicular to top 43 is vertically aligned and is journaled for rotation in bearings mounted on the top 43 of frame 19. The shaft 41 is preferably positioned in about the widthwise center of the frame 19 so that the work-engaging member 37 describes a turning radius from one side to the other side of the frame 19. In this position, the work-engaging member 37 is mounted within the confines of the frame 19. The shaft 41 extends below the top 43 of the frame 19 and is connected to a crank member 45.

The turning movement of work-engaging member 37 is accomplished by a hydraulic power device generally indicated at 47 and pivotably connected at one end to crank member 45 and at the other end to the frame 19 underneath the top 43. The power device 47 shown is in the form of a hydraulic cylinder 51 and piston rod 49 with the piston rod 49 thereof connected at one end to one of the pivot points mentioned above and the cylinder 51 connected to the other of the pivot points mentioned. The power device 47 may be lengthened or shortened to effect the turning movements of the workengaging members 35, 37 and 39.

The pivotal connection of the power device 47 to the crank member 45 is made by connecting one end of the fluid power device 47 between a pair of vertically spaced arms 53 of the crank member 45. The power device 47 is secured between the arms 53 by a pin 55 passing through aligned holes in the arms and the end of the power device 47 which is positioned between the arms 53.

The work-engaging member 37 includes an inclined surface 57 which is radially spaced from the axis of rotation so as to engage the workpiece 15 as the work-engaging member 37 is turned into the billet 15. The inclined surface 57 ascends from a lower portion in close proximity to the workpiece 15 or center of the frame 19 to a higher portion located near the one side of the frame 19. As the member 37 is turned the lower portion of the inclined surface 57 first engages the workpiece 15. A further turning causes the workpiece 15 to be pushed upwardly and outwardly.

At the top portion of the inclined surface 57, an abutment 59 projects upwardly from the inclined surface 57 to engage the workpiece 15 and urge it laterally across the frame 19. The abutment 59 has a vertical surface and is in the form of a shaft 61 which is constrained along with the inclined surface 57 to rotate about a vertical axis through a point near the lower extremity of the workengaging member 37.

Figure 3:
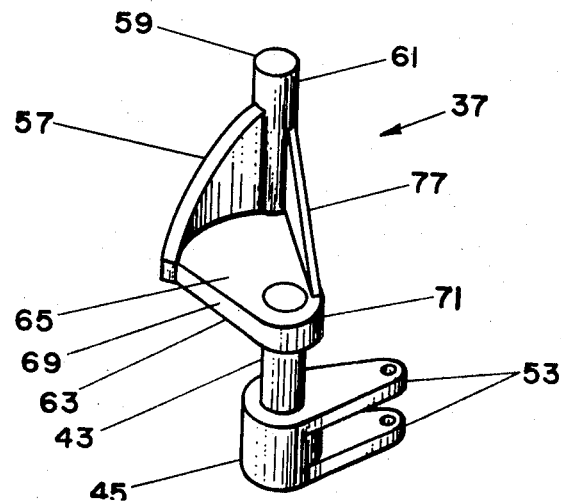
FIG. 3 is a perspective view of the discharging and clamping apparatus.

As illustrated in FIG. 3 the work-engaging member 37 comprises a triangular shaped base 63 having a flat top surface 65 and bottom surface. Sides 69 and 71 extend radially outwardly from that portion of the base 63 which is mounted to the shaft 41 as hereinbefore described. An arcuate wall 75 which is preferably a substantially constant radial distance from the axis of rotation of member 37, extends between the radial sides 69 and 71. The arcuate wall 75 includes a top inclined surface 57 which extends upwardly from the junction of the wall 75 and radial side 69 to the shaft 61. The shaft 61 extends vertically from the junction of radial side 71 and the wall 75. The shaft 61 projects above the high end of the wall 75 so as to present a vertical clamping surface to the billet 15.

A second inclined wall 77 extends from the shaft 61 along the radial side 71 so as to give added structural strength to the workengaging member 37. Wall 77 is inclined from a high side running along shaft 61 to the portion of the base mounted to shaft 41.

The work-engaging member 37 or 39 may be cast as one piece or may comprise a plurality of parts welded or otherwise secured rigidly together.

In another embodiment of the present invention, work-engaging member 35 is adapted to clamp and discharge small workpieces or billets 15 such as might only extend across the two turning spools 21. An elongated base member 79 of the work-engaging member 35 is mounted at one end of the frame 19 for turning about a vertical axis in a manner similar to the mounting of work-engaging members 37 and 39. The work-engaging member 35 includes a vertically extending wall 81 having horizontally extending mounting plate 83 which is journaled for rotation on a shaft 85 at the other end of base member 79.

The wall 81 includes a pair of projecting members 85 and 87 at either end thereof. Each projecting member 86 and 87 has an inclined surface 89. The inclined surface 89 projects outwardly at the bottom thereof and joins the wall 81 at an upper portion spaced from the top of the wall 81 to form an abutment 91. Thus, a pair of inclined surfaces 89, and an abutment 91 at the upper portion of the wall 81 are presented to a workpiece 15 for clamping and discharging.

As illustrated in the drawings, the inclined surfaces 57 and 89 are preferably at about a 45° angle, especially when rectangular or square billets are being turned. This angle of inclination results in a supporting surface for a bottom side of the billet 15 when a corner is being ground.

A plurality of guide members 93 project outwardly from one side of the frame 19. The guide members 93 have top guide surfaces which are inclined downwardly from an elevation corresponding to the peripheral surface of a spool 21 at the end thereof. These guide members 93 serve to guide the billet away from the billet manipulator 11.

In the preferred embodiment of the present invention as illustrated in the drawings, the clamping and discharging apparatus 17 of the present invention is adapted to work in cooperation with the spools 21. At one end of the spools 21 along one side of the frame 19, the peripheral surface of the spools 21, include a plurality of flanges 95 projecting outwardly to form stops.

At one position a rectangular billet 15 is supported on a horizontal peripheral surface of the spool 21 so that a flat side of the billet 15 is presented to a grinding machine. In another position, the billet 15 is rotated 45 degrees from the first position by rotating the spool 180° so that a corner of the billet 15 is exposed to a grinding machine. At each of these aforementioned positions, the flanges 95 act as stops adjacent the billet 15. The billet 15 is clamped between the flanges or stops 95 and the abutments 59 and 91 of the work-engaging members 35, 37 amd 39.

Figure 4:
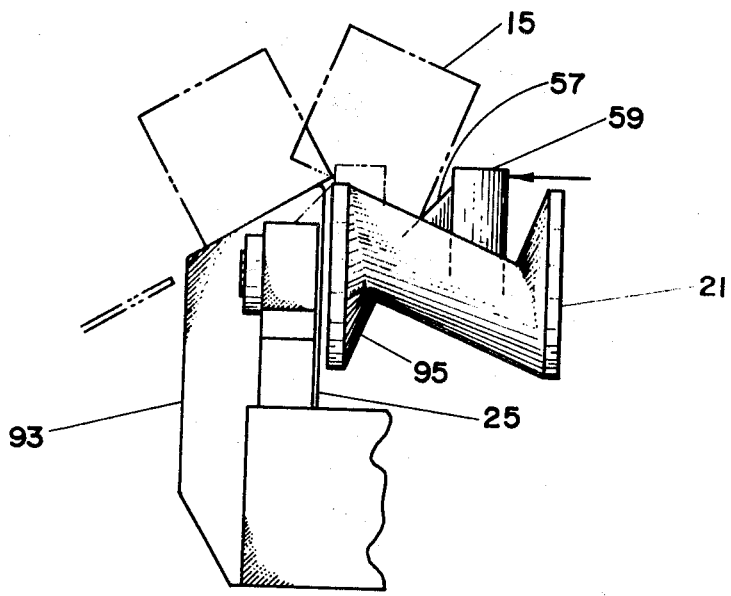
FIG. 4 is a partial front elevational view of the billet manipulating apparatus.

In intermediate positions of the spool, as illustrated in FIG. 4 flanges do not stop the lateral movement of the billet 15, the actuation of the clamping and discharging device serves to push the billet upwardly and off the edge of the peripheral surface of the spool 21. Although two clamping positions are shown in the drawings, it is within the scope of the present invention that the flanges of the spools 21 extend radially outwardly from other positions to permit clamping the billet at various positions.

While preferred embodiments of the present invention have been described and illustrated, it is to be recognized that modifications thereof may be made without departing from the broad spirit and scope of the present invention as described in the appended claims.

What is claimed is:

1. A workpiece clamping and discharging apparatus for a workpiece manipulating apparatus of the type comprising a plurality of spools for supporting and turning a workpiece along the length thereof, means for supporting said spools for rotation about substantially parallel and spaced axes, each spool having a contoured peripheral surface for turning a workpiece in engagement therewith about an axis in a plane substantially normal to the axis of rotation of said spool, said workpiece clamping and discharging apparatus comprising a work-engaging means journaled on said supporting means for rotation about a fixed axis, means for turning said work-engaging means about the fixed axis, said work-engaging means having an inclined surface spaced from the axis and an abutment at an outer portion for urging the workpiece laterally across the frame as the work-engaging means is rotated.

2. An apparatus according to claim 1 wherein said spools have a flanged portion at one end thereof for clamping the workpiece between the flanged portion and the abutment.

3. An apparatus according to claim 1 wherein said workengaging member includes a shaft connected to the base.

4. An apparatus according to claim 3 wherein said turning means includes a crank connecting said shaft and a fluid pressure means connected between said crank and said supporting means for turning said crank.

5. An apparatus according to claim 1 wherein said workengaging means includes a base, an arcuate wall having an inclined top surface at one end of the base, a shaft connected to the other end of the base, said shaft journaled on said supporting means for rotation about the fixed axis.

6. An apparatus according to claim 5 wherein the abutment comprises a second shaft extending upwardly from the base along the high end of the arcuate wall.

7. An apparatus according to claim 6 wherein said workengaging means includes another wall connected at one end to the second shaft and extending along the base.

8. An apparatus according to claim 1 wherein said workengaging means includes a base, a shaft connected to one end of the base and journaled on said supporting means for rotation about the fixed axis, a second shaft mounted on the other end of said base, a wall mounted on said second shaft for rotation, said wall includes a pair of projections having inclined surfaces.

* * * * *